United States Patent [19]

Lew

[11] Patent Number: 5,014,559

[45] Date of Patent: May 14, 1991

[54] ROTAMETER WITH READ-OUT DEVICE

[76] Inventor: Hyok S. Lew, 7890 Oak St., Arvada, Colo. 80005

[21] Appl. No.: 551,065

[22] Filed: Jul. 11, 1990

[51] Int. Cl.$^5$ .................................................. G01F 1/24
[52] U.S. Cl. ................................. 73/861.56; 73/861.57
[58] Field of Search ............ 73/861.57, 861.56, 861.55

[56] References Cited

PUBLICATIONS

Tarshish "Highly Sensitive Rotometer" in Izmeritel Naya Tekhnika, No. 4, 4/65, pp. 39–42.

*Primary Examiner*—Herbert Goldstein

[57] ABSTRACT

An apparatus for measuring flow rate of fluid comprises a flow passage including a first vertical section with cross sectional area increasing from the lower end to the upper end thereof, and a second vertical section with cross sectional area increasing from the upper end to the lower end thereof; a first and second flow obstructing members respectively disposed in the first and second vertical sections of the flow passage in an unrestrained arrangement wherein the first and second flow obstructing members are tethered to one another by a flexible elongated member disposed in a freely slidable arrangement; and a read-out device indicating the position of the first and/or second flow obstructing members, wherein the drag force exerted by the fluid flow moving through the flow passage in a direction from the first to the second vertical sections of the flow passage moves the combination of the two flow obstructing members in the direction of the fluid flow until the drag force is counter-balanced by the resultant force exerted by the combination of the two flow obstructing members, which resultant force may be the difference in the weight or the difference in the buoyancy between the first and second flow obstructing members and, consequently, flow rate of the fluid is determined from the position of the combination of the two flow obstructing members.

19 Claims, 3 Drawing Sheets

ROTAMETER WITH READ-OUT DEVICE

BACKGROUND OF THE INVENTION

One of the simplest and yet very widely used flowmeters is the rotameter, which comprises a vertically disposed tapered flow passage with cross section progressively increasing from the bottom inlet to the top outlet and a flow obstructing member suspended in the fluid stream by the drag force exerted by the upwardly moving fluid, wherein the flow rate of the fluid is determined from the vertical position of the flow obstructing member that is lifted by the drag force counter-acting the weight thereof. The present-day rotameter has a serious deficiency: The lack of a read-out device that provides flow rate in the form of electrical signals that can be fed into a flow computer or other flow data processing device. There are a few rotameters available today which employ one or another form of transducer converting the position of the flow obstructing member to an electrical signal, but the accuracy and reliability of these transducers is quite marginal at best and most of the rotameters in use today have only visual read-out means such as a scale or dial. Since an overwhelming majority of flowmeters employed in industrial, commercial and medical applications constitute elements in automatic process control, it is imperative that the flowmeters must have an electrical form of read-out that can be fed into flow data processors and/or flow control devices. Another deficiency of the present day rotameters is that every individual rotameter has to be calibrated for the specific fluid under measurement, as the force counter-balanced by the drag force of the fluid flow does not remain constant due to the buoyancy force experienced by the flow obstructing member in the rotameter, which buoyancy force changes as a function of the fluid density. A further deficiency of the existing rotameters is their inability to measure the volume flow rate of fluid directly, as they measure the drag force as a measure of the fluid flow instead of the volume or mass flow rate of fluid.

BRIEF SUMMARY OF THE INVENTION

The primary object of the present invention is to provide a rotameter with a tranducer means that provides a rotameter read-out in the form of electrical signals, which can be displayed remotely or fed into a data processor or flow controlling device.

Another object is to provide a universal rotameter that measures the dynamic pressure of fluid flow independent of the density of fluid.

A further object is to provide a universal rotameter that measures the volume flow rate of fluids independent of the density of fluid.

Yet another object is to provide a universal rotameter that measures the mass flow rate of fluids independent of the density of fluid.

Yet a further object is to provide a bidirectional rotameter that measures fluid flow through a flow passage in both directions.

These and other objects of the present invention will become clear as the description thereof progresses.

BRIEF DESCRIPTION OF FIGURES

The present invention may be described with a greater clarity and specificity by referring to the following figures.

DESCRIPTION OF THE ILLUSTRATED EMBODIMENTS

Figure 1:
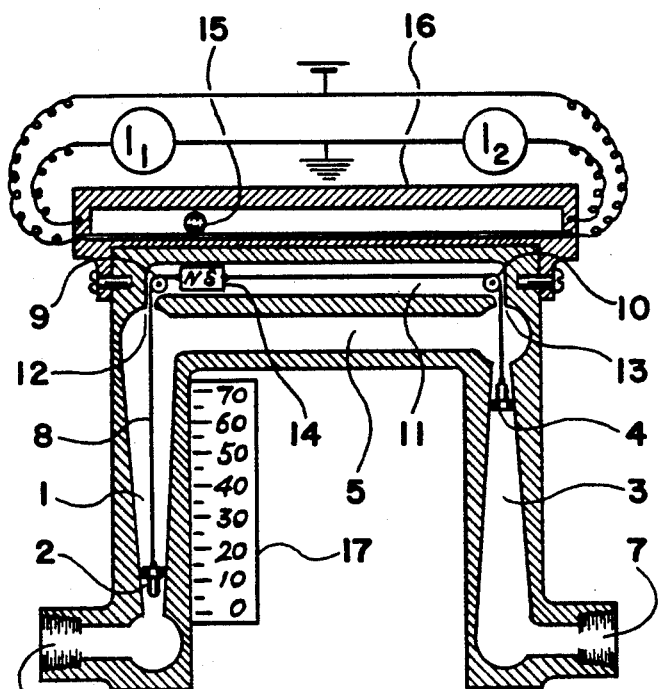
FIG. 1 illustrates a cross section of an embodiment of the universal rotameter of the present invention, which has a visual read-out means or electrical read-out means.

In FIG. 1 there is illustrated a cross section of an embodiment of the universal rotameter constructed in accordance with the principles of the present invention. The universal rotameter includes a first vertically disposed tapered flow passage 1 with a flow obstructing member 2 suspended in the flow stream wherein the cross section of the flow passage increases from the bottom to the top, and a second vertically disposed tapered flow passage 3 with a flow obstructing member 4 wherein the cross section of the flow passage increases from the top to the bottom, which two tapered flow passages 1 and 3 are connected to one another by a horizontal flow passage 5. The bottom end of the first tapered flow passage 1 is connected to an inlet 6, while the bottom end of the second tapered flow passage 3 is connected to an outlet 7. The two flow obstructing members 2 and 4 are connected to one another by a highly flexible elongated member 8 such as a string or cable, which is guided by a pair of rollers or rods 9 and 10, and routed through an elongated cylindrical cavity 11 disposed parallel and adjacent to the horizontal section 5 of the flow passage, wherein the two extremities of the cylindrical cavity 11 respectively have two small openings 12 and 13, through which the flexible elongated member 8 extends in connecting the two flow obstructing members 2 and 4. The flexible elongated member 8 may include a magnet 14 disposed intermediate the two rollers or rods 9 and 10 and secured thereto. The ferromagnetic ball contact 15 included in a linear potentiometer 16 follows the magnet 14 in a rolling motion. The potentiometer 16 provides electrical read-outs representing the position of the flow obstructing member 2 or 4 as a measure of the flow rate of fluid moving through the flow passage. As an alternative to or in addition to the potentiometer 16, a visual read-out means 17 such as a scale providing a reference for the position of the flow obstructing member 2 may be included, wherein the scale indicates the flow rate of fluid through the flow passage.

Figure 2:
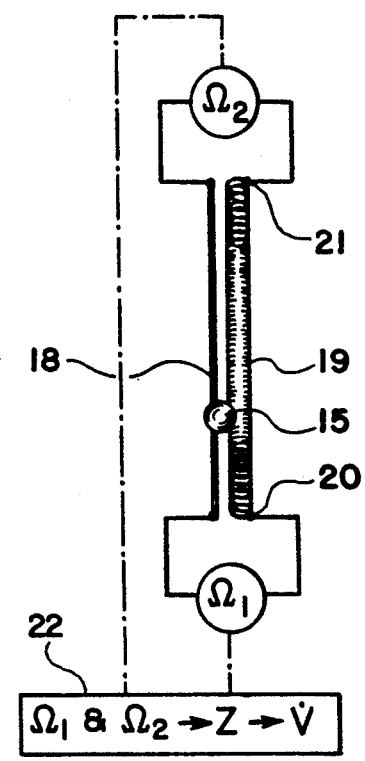
FIG. 2 illustrates an embodiment of the electrical read-out means employed in the universal rotameter shown in FIG. 1.

In FIG. 2 there is illustrated the potentiometer included in the universal rotameter shown in FIG. 1. The ball contact 15 made of a ferromagnetic material rolls on and is guided by a pair of elongated members 18 and 19, wherein at least one of the two elongated members 19 has a high specific ohmic resistance, which may be a coil of high ohmic resistance wire as shown in the particular illustrative embodiment or a simple elongated wire or rod made of a material having high ohmic resistance. The relative position of the ball contact 15 intermediate the two extremities 20 and 21 of the elongated member 19 of high specific ohmic resistance is determined by measuring the ohmic resistances $\Omega_1$ and $\Omega_2$ of two sections of the elongated member 19 respectively located on the two opposite sides of the ball contact 15. As the position of the ball contact 15 can be readily converted to the position of the flow obstructing member 2 or 4, the flow rate of fluid moving through the flow passage can be determined as a function of $\Omega_1$ and $\Omega_2$, which functional relationship may be determined empirically or theoretically, wherein the algorithm involved in that function is carried out by a data processor 22 which derives flow rates of the fluid from the two measured ohmic resistances $\Omega_1$ and $\Omega_2$.

The universal rotameter shown in FIG. 1 can operate in two different modes. In the first mode of operation, the rotameter measures the dynamic pressure of fluid flow universally independent of the density of fluid. The two flow obstructing members 2 and 4 designed for the first mode of operation have the same volume V and, consequently, the bouyancy forced thereon are the same and cancel one another, while the weight $W_1$ of the first flow obstructing member 2 is greater than the weight $W_2$ of the second flow obstructing member 4. The drag forces on the two flow obstructing members 2 and 4 is counter balanced by the difference in the weight thereof, which condition yields equation $$\tfrac{1}{2}C_{D1}\rho u_1^2 + \tfrac{1}{2}C_{D2}\rho u_2^2 = W_1 - W_2, \tag{1}$$

where $C_D$ is the drag coefficient of the flow obstructing member, $\rho$ is the density of fluid, u stands for the local value of the fluid velocity at the cross section where the flow obstructing member is located, and the subscripts 1 and 2 stand for the first and second flow obstructing members. The local value of the fluid velocity u can be expressed as a function of the averaged value of the fluid velocity U across a reference cross section of the flow passage such as a cross section of the horizontal flow passage 5 with cross sectional area equal to A. Hence, equation (1) may be written in the form $$[C_{D1}f_1(z)+C_{D2}f_2(z)]\tfrac{1}{2}\rho U^2 = W_1 - W_2, \tag{2}$$

where $f_1$ and $f_2$ respectively are functions relating the local value of the fluid velocity u to the averaged value of the fluid velocity U, and z is the position of the flow obstructing member 2 measured from a reference position corresponding to the zero flow. Equation (2) yields the following equation for the total dynamic pressure of fluid flow:

$$\tfrac{1}{2}\rho U^2 A = \frac{A(W_1 - W_2)}{C_{D1}f_1(z) + C_{D2}f_2(z)}, \tag{3}$$

which equation is universally valid for all fluids independent of the density thereof as all parameters appearing on the right hand side of equation (3) are independent of the fluid density. If the combination of the first tapered flow passages 1 and the flow obstructing member 2 is identical to the combination of the second tapered flow passage 3 and the flow obstructing member 4, equation (3) reduces to $$\tfrac{1}{2}\rho U^2 A = \frac{A(W_1 - W_2)}{2C_D f(z)}. \tag{4}$$

The functions $f_1$ and $f_2$ or f relating the local value of the fluid velocity u to the averaged value of the fluid velocity U should be determined empirically by calibrating the flowmeter. Once $f_1$ and $f_2$ or f are determined empirically, the universal rotameter shown in FIG. 1 measures the total dynamic pressure of all fluids by equation (3) or (4) independent of the fluid density, which operating principles contrast the conventional rotameter that has to be calibrated for each fluid of different density. When the universal rotameter shown in FIG. 1 has an electrical read-out means, the data processor 22 shown in FIG. 2 determines z from the $\Omega_1$ and $\Omega_2$, and then determines the total dynamic pressure from equation (3) or (4). When the universal rotameter has a visual read-out means, the scale 17 are arranged in such a way that the scale directly represent the total dynamic pressure in accordance with equation (3) or (4). It becomes clear from equation (3) that one of the two tapered flow passages 1 and 3 may be changed to a flow passage with a constant cross section area. In other words, the universal rotameter shown in FIG. 1 may have only one tapered flow passage. Of course, employing two identical tapered flow passages simplifies the algorithm required in determining the total dynamic pressure as a function of the position of the flow obstructing member as shown by equation (4).

In the second mode of operation, the universal rotameter shown in FIG. 1 measures the velocity or volumetric flow rate of fluid. In this mode of operation, the two flow obstructing members 2 and 4 have the same weight W, while the first flow obstructing member 2 has a displacement volume $V_1$ less than the displacement volume $V_2$ of the second flow obstructing member. The net force counter balancing the drag force on the two flow obstructing members 2 and 4 is the bouyancy force, as the weights of the two flow obstructing members 2 and 4 cancel one another, which condition of equilibrium of forces yields equation $$\tfrac{1}{2}C_{D1}\rho u_1^2 + \tfrac{1}{2}C_{D2}\rho u_2^2 = \rho(V_2 - V_1), \tag{5}$$

where the symbols stand for the same quantities as those defined in conjunction with equation 1. By using the same process that yielded equation (2) from (1), equation (5) can be reduced to $$[C_{D_1}f_1(z) + C_{D_2}f_2(z)]\tfrac{1}{2}\rho U^2 = \rho(V_2 - V_1). \quad (6)$$

Equation (6) yields the following equation for the mean velocity averaged over a cross section are A:

$$U = \sqrt{\frac{2(V_2 - V_1)}{C_{D_1}f_1(z) + C_{D_2}f_2(z)}} . \quad (7)$$

If the combination of the first tapered flow passage 1 and the flow obstructing member 2 has the same construction as the combination of the second tapered flow passage 3 and the flow obstructing member 4, equation (7) reduces to $$U = \sqrt{\frac{V_2 - V_1}{C_D f(z)}} . \quad (8)$$

It should be noticed that the two flow obstructing members 2 and 4 included in the universal rotameter measuring the fluid velocity in accordance with equation (7) or (8) have the same weight W and different displacement volumes $V_1$ and $V_2$. In the universal rotameter operating by equation (8), the two flow obstructing members 2 and 4 have the same apparent volume, but different displacement volume as the hollow cavity included in the first flow obstructing member 2 has one or more holes allowing the fluid to fill it up, while the cavity included in the second flow obstructing member 4 is sealed off and evacuated or filled with air or other gas. The universal rotameter with an electrical read-out means determines z from $\Omega_1$ and $\Omega_2$, and then determines the fluid velocity U in accordance with equation (7) or (8), which algorithm is carried out by a data process 22 shown in FIG. 2, while the universal rotameter with visual read-out means has read-out scale directly providing the fluid velocity arranged per equations (7) or (8). It should be again mentioned that only one of the two flow passages 1 and 3 shown in FIG. 1 need to be tapered. The parameters or functional relationship included in equation (7) or (8) should be determined empirically by calibrating the rotameter. It should be noticed that all parameters appearing on the right hand side of equation (7) or (8) are independent of the fluid properties such as density. As a consequence, once the relationship between U and z is determined empirically, the same relationship is applicable universally to all fluids. Therefore, the universal rotameter operating on equation (8) or (7) measures fluid velocity for all fluids. Of course, conventional rotameters are not capable of measuring fluid velocity directly. It should be mentioned that when the volume of the flow obstructing member can not be made large enough to create the required bouyancy force given by the right hand side of equation (5) or (6), the embodiment shown in FIG. 8 or 9 should be employed.

Figure 3:
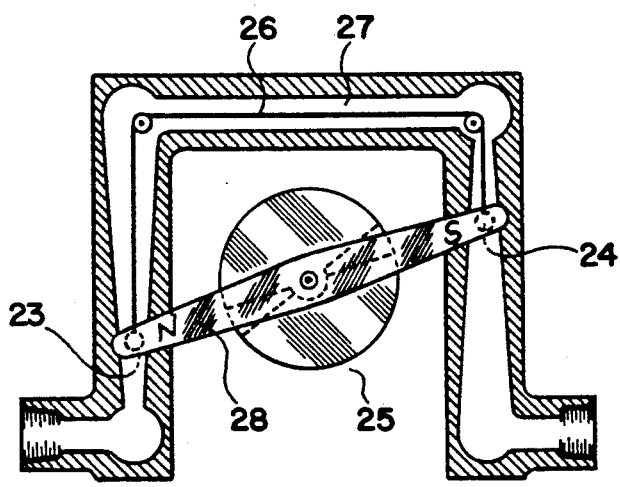
FIG. 3 illustrates a cross section of another embodiment of the universal rotameter including an electrical read-out menas.

In FIG. 3 there is illustrated a cross section of another embodiment of universal rotameter having essentially the same construction as that of the embodiment shown in FIG. 1, which has an electrical read-out means that determines the position of the flow obstructing member 23 or 24 by measuring the capacitance of a variable area rotary capacitor 25. In this particular embodiment, the flexible elongated member 26 tethering the two flow obstructing members 23 and 24 to one another is routed through the horizontal section 27 of the flow passage. The variable area rotary capacitor 25 comprises one or more arms 28 with magnetized extremities radially extending from the rotor plate of the variable area rotary capacitor 25, wherein the magnetized extremities of the arm 28 following the flow obstructing members 23 and 24 rotates the rotor plate and changes the capacitance of the variable rotary area capacitor as a function of the position of the flow obstructing member 23 or 24. The combination of the rotor plate of the variable area capacitor and the arm 28 must be balanced near perfectly about the axis of rotation thereof, whereby the movement of the flow obstructing members 23 and 24 made of a ferromagnetic material or including a ferromagnetic element therein under the drag force exerted by the moving fluid is not hampered by the arm 28 with magnetized extremities.

Figure 4:
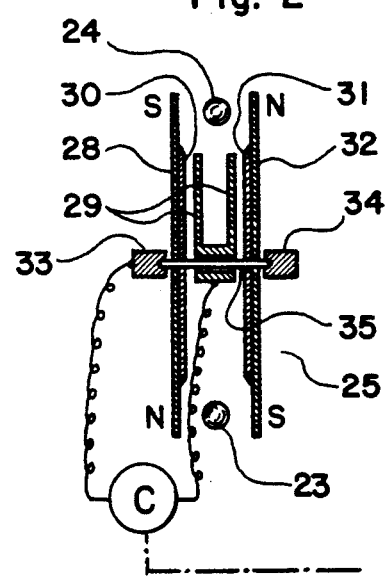
FIG. 4 illustrates another embodiment of the electrical read-out means employed in the universal rotameter shown in FIG. 3.

In FIG. 4 there is illustrated a cross section of the variable area rotary capacitor 25 included in the universal rotometer shown in FIG. 3, which cross section is taken along a plane including the axis of rotation of the rotor plate. The stator plates 29 of a fractional circular shape are non-rotatably affixed to a frame anchored to the rotameter, while the rotor plates 30 and 31 of a fractional circular shape including the arms 28 and 32 with magnetized extremities are rotatably supported by the bearings 33 and 34, which bearings as well as the shaft 35 of the rotor plates are made of an electrically conducting material. The capacitance between the stator plates 29 and the rotor plates 30 and 31 changes as the arms 28 and 32 rotate following the flow obstructing members 23 and 24. As a consequence, the position of the flow obstructing member 23 or 24 can be determined as a function of the capacitance C, from which the dynamic pressure or the fluid velocity is determined by a data processor on principles described in conjunction with FIGS. 1 and 2.

Figure 5:
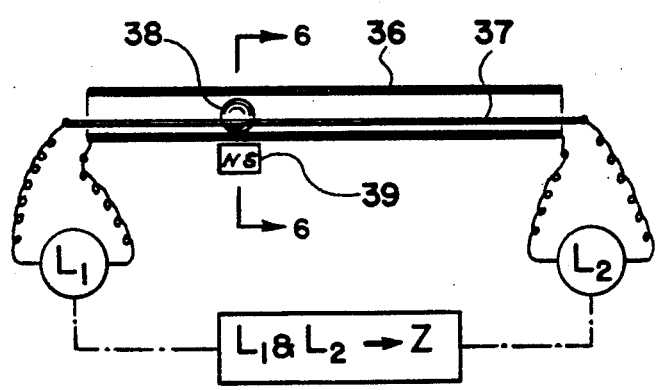
FIG. 5 illustrates a further embodiment of the electrical read-out means that can be used in place of the electricalread-out means shown in FIG. 2.

In FIG. 5 there is illustrated a further embodiment of the electrical read-out device, that can be used in place of the embodiment shown in FIG. 2. This electrical read-out device includes a coil 36 and a conductor rod 37 disposed within the coil in a parallel relationship, on which combination a ball contact 38 guided thereby rolls. Of course, the ball contact follows the magnet 39 attached to the flexible elongated member tethering the two flow obstructing members to one another as shown in FIG. 1. The relative position of the ball contact 38 or the magnet 39 intermediate the two extremities of the coil 36 is determined from two inductance values $L_1$ and $L_2$ of the two sections of the coil located on the two opposite sides of the ball contact 38, which position determines the position z of the flow obstructing member 2 or 4 shown in FIG. 1. It is readily recognized that the position sensing potentiometer operating on the principles described in conjunction with FIG. 2 may be constructed in an arrangement shown in FIG. 5, while the reluctive position sensor shown in FIG. 5 may be constructed in an arrangement shown in FIG. 2.

Figure 6:
FIG. 6 illustrates a cross section of the electrical read-out means shown in FIG. 5.

In FIG. 6 there is illustrated a cross section of the combination of the coil 36 and rod 37 taken along plane 6—6 as shown in FIG. 5. The ball contact 38 rolling on the combination of the coil 36 and rod 37 provides electrical connection therebetween.

Figure 7:
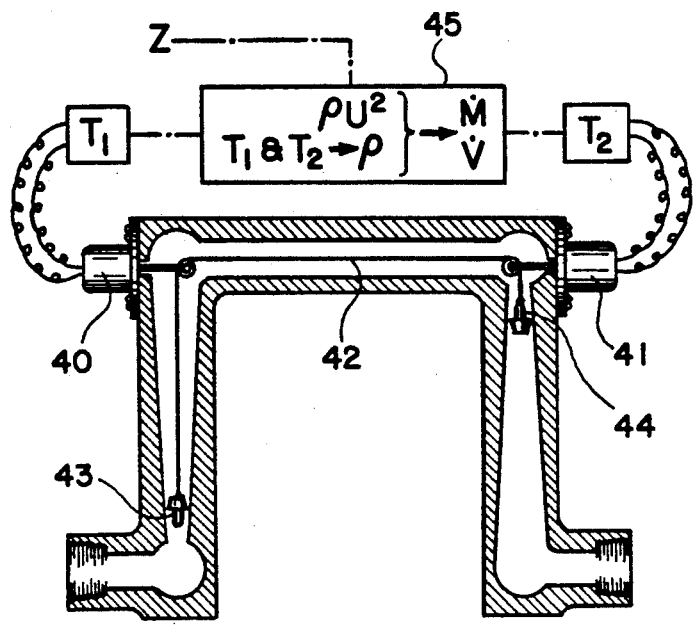
FIG. 7 illustrates a cross section of a further embodiment of the universal rotameter measuring the mass flow rate of fluid.

In FIG. 7 there is illustrated a further embodiment of the universal rotameter having essentially the same construction as that shown in FIG. 1 or 3 with one exception, that is the inclusion of the tension transducers 40 and 41, which measure the tension on the horizontal segment of the flexible elongated member 42 tethering the two flow obstructing members 43 and 44 to one another, wherein the flow obstructing members 43 and 44 have the same volume V and different weight $W_1$ and $W_2$. The condition of equilibrium of forces acting on the two flow obstructing members of identical construction and arrangement readily yields the following equation for the density $\rho$ of the fluid:

$$\rho = \frac{W_1 + W_2 - (S_1 + S_2)}{2V}, \quad (9)$$

where $S_1$ and $S_2$ are tensions on the elongated flexible member 42 measured by the two tension transducers 40 and 41, respectively. As an alternative arrangement, only one of the two tension transducers 40 and 41 may be included, wherein the fluid density $\rho$ is determined by equation $$\rho = \frac{W_1 + W_2 - 2S}{2V}. \quad (10)$$

The universal rotameter shown in FIG. 7 determines the total dynamic pressure $\rho U^2 A/2$ per equation (3) or (4), and the fluid density $\rho$ per equation (9) or (10). The data processor 45 executes the algorithm that determines the mass and/or volume flow rate M and V from the measured values of the total dynamic pressure $\rho U^2 A/2$ and the fluid density $\rho$.

Figure 8:
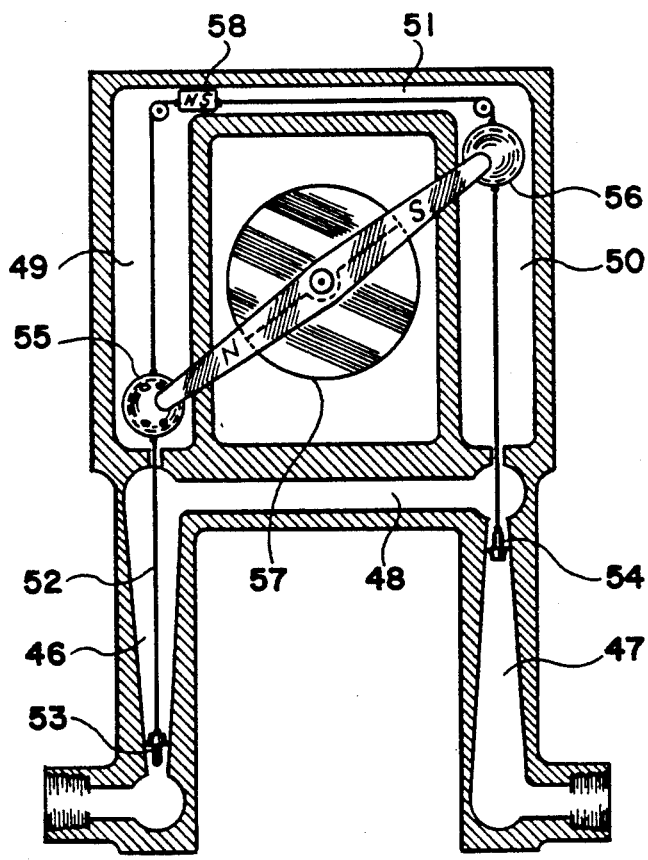
FIG. 8 illustrates a cross section of yet another embodiment of the universal rotameter measuring the volume flow rate of fluid.

In FIG. 8 there is illustrated a cross section of the universal rotameter measuring the fluid velocity or the volume flow rate, which is a modified version of the embodiments shown in FIGS. 1 and 3. The two vertically disposed tapered flow passages 46 and 47 connected to one another by a horizontal section 48 of the flow passage respectively include the two elongated cavities 49 and 50 connected to one another by a horizontal cavity 51, which combination of cavities are all filled with the fluid. The flexible elongated member 52 tethering the two flow obstructing members 53 and 54 to one another is routed through the combination of the cavities 49, 50 and 51, and includes a dummy float 55 disposed in the cavity 49 and attached thereto and a real float 56 disposed in the cavity 50 and attached thereto. The dummy float 55 has a hollow core with one or more holes through the shell thereof that is filled with the fluid, while the real float 56 has a sealed hollow core evacuated or filled with air or other gas of negligibly small mass. The combined weight of the first flow obstructing member 53 and the dummy float 55 is the same as the combined weight of the second flow obstructing member 54 and the real float 56. The position of the flow obstructing member 53 or 54 is determined by an electrical read-out device such as a variable area rotary capacitor 57 described in conjunction with FIGS. 3 and 4, or a magnet 58 attached to the horizontal segment of the flexible elongated member 52, that moves the ball contact included in a potentiometeric position sensor shown in FIG. 2 or the ball contact included in a reluctive position sensor shown in FIG. 5. This universal rotameter determines the fluid velocity as a function of the position of the flow obstructing member 53 or 54 per equation (7) or (8). It should be mentioned once more that only one of the two flow passages 46 and 47 need to be tapered.

Figure 9:
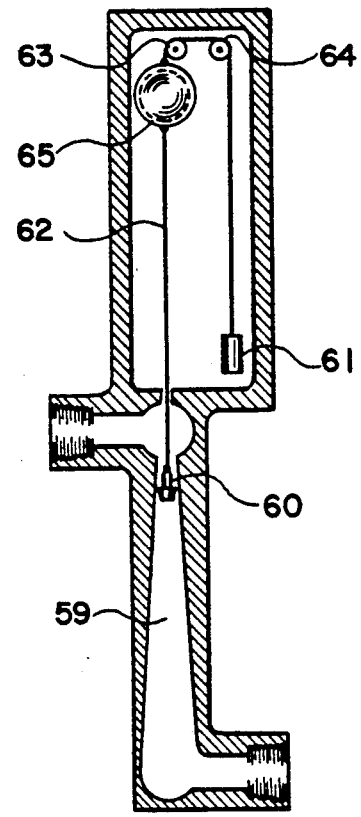
FIG. 9 illustrates a cross section of yet a further embodiment of the universal rotameter measuring the volume flow rate of fluid.

In FIG. 9 there is illustrated a cross section of an embodiment of the universal rotameter measuring the fluid velocity or volume flow rate per an equation similar to equation (8), which comprises a single vertically disposed tapered flow passage 59 with cross sectional area increasing from top to bottom thereof, and a flow obstructing member 60 tethered to a counter weight 61 by a flexible elongated member 62 slidably supported by a pair of rollers or rods 62 and 63, which flexible elongated member 62 includes a float 65 disposed intermediate the flow obstructing member 60 and the roller or rod 63 and attached thereto. The combined weight of the flow obstructing member 60 and the float 65 is the same as the weight of the counter weight 61. When the float 65 is eliminated and the counter weight 61 has a weight less than the weight of the flow obstructing member 60 while they have the same volume, this universal rotameter measures the total dynamic pressure of the fluid flow per equation similar to equation (4).

Figure 10:
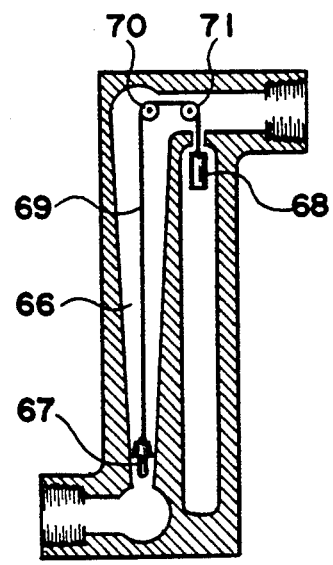
FIG. 10 illustrates a cross section of still another embodiment of the universal rotameter measuring the dynamic pressure of fluid flow.

In FIG. 10 there is illustrated a cross section of an embodiment of the universal rotameter measuring the total dynamic pressure of the fluid flow per equation similar to equation (4), which includes a single vertically disposed tapered flow passage 66 with cross sectional area increasing from bottom to top thereof, and a flow obstructing member 67 tethered to a counter weight 68 by a flexible elongated member 69 slidably supported by the rollers or rods 70 and 71. The flow obstructing member 67 and the counter weight 68 have the same volume, while the former has a weight greater than that of the latter. It is readily recognized that an electrical read-out means such as that shown in FIG. 2, 4 or 5 may be incorporated into the universal rotameters shown in FIGS. 9 and 10.

Figure 11:
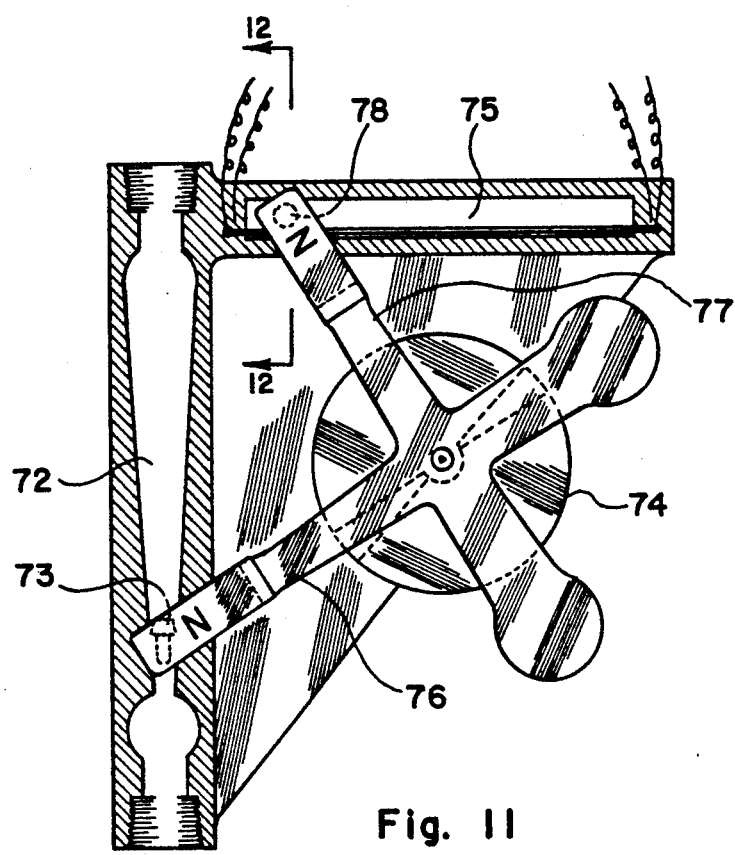
FIG. 11 illustrates a cross section of an embodiment of the rotameter with an electrical read-out means.

In FIG. 11 there is illustrated a cross section of the conventional rotameter including a single vertically disposed tapered flow passage and a flow obstructing member 73 that is not balanced by any counter weight, which now employs an electrical read-out means such as a variable area rotary capacitor position transducer 74 similar to that shown in FIG. 4 or a potentiometric or reluctive position transducer 75 similar to that shown in FIGS. 2 or 5. The movement of the flow obstructing member 73 made of or including a ferromagnetic material rotates the arm 76 with magnetized tip, which arm rotates the rotor plates of the variable area rotary capacitor 74, or it rotates another arm 77 with magnetized tip that moves the ball contact 78 included in a potentiometric or reluctive position transducer disposed in a horizontal position. Of course, this rotameter shown in FIG. 11 has to be calibrated for the specific fluid under flow measurement. All of the rotatable members such as the arms 76 and 77, and rotor plates must be precisely balanced about the axis of rotation.

Figure 12:
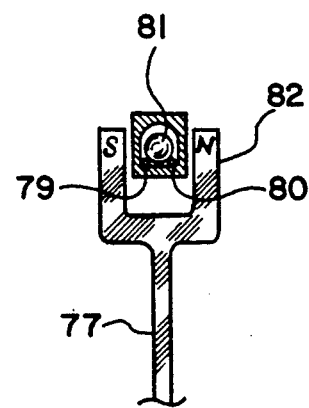
FIG. 12 illustrates a cross section of the electrical read-out means included in the rotameter shown in FIG. 11.

In FIG. 12 there is illustrated a cross section of a potentiometric position transducer employed in the embodiment shown in FIG. 11, which cross section is taken along plane 12—12 as shown in FIG. 11. At least one of the two rods or wires 79 and 80, on which the ball contact 81 rolls, must have a high specific ohmic resistance. A horseshoe type magnet 82 affixed to the extremity of the arm 77 moves the ball contact 81. The arm 76 includes a horseshoe type magnet affixed to the extremity thereof, which follows the flow obstructing member 73.

Figure 13:
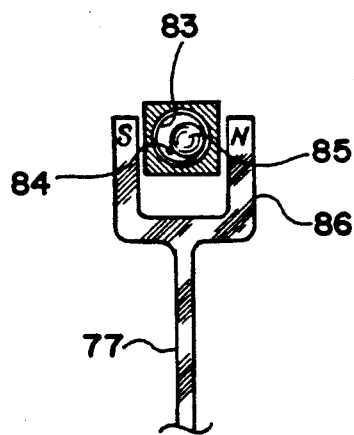
FIG. 13 illustrates a cross section of another electrical read-out means usable in place of the electrical read-out means shown in FIG. 12.

In FIG. 13 there is illustrated a cross section of a potentiometric or reluctive position transducer employed in the embodiment shown in FIG. 11, that includes a coil 83, a conductor rod 84 and a ball contact 85 moved by a horseshoe type magnet 86 affixed to the extremity of the arm 77.

Figure 14:
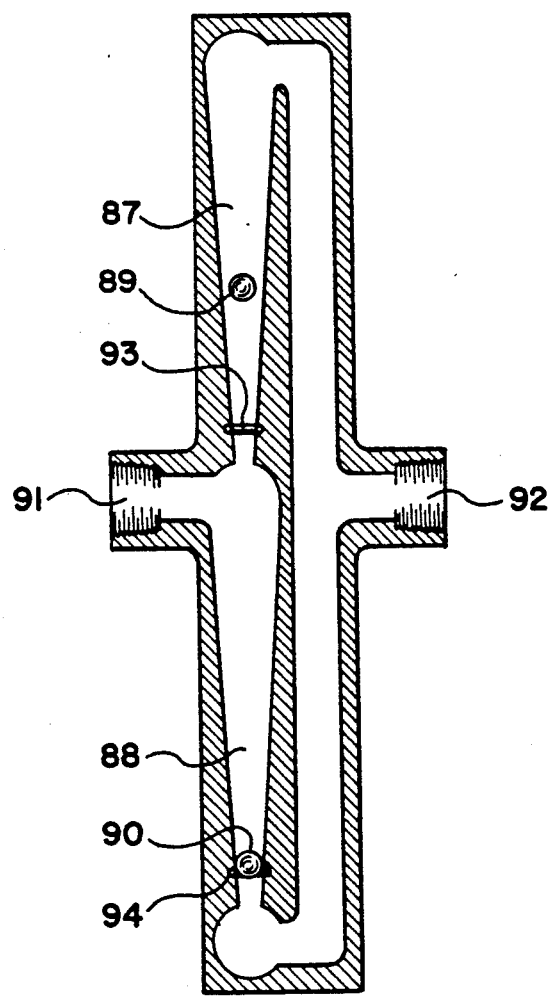
FIG. 14 illustrates a cross section of an embodiment of the bidirectional rotameter of the present invention.

In FIG. 14 there is illustrated a cross section of a bidirectional rotameter comprising two vertically disposed tapered flow passages 87 and 88 respectively including the two flow obstructing members 89 and 90. The converging extremity of the tapered flow passage 87 and the diverging extremity of the tapered flow passage 88 are connected to a first common port 91, while the diverging extremity of the tapered flow passage 87 and the converging extremity of the tapered flow passage 88 are connected to a second common port 92. The fluid flow from the port 91 to the port 92 takes the tapered flow passage 87, and the fluid flow from the port 92 to the port 91 takes the tapered flow passage 88, as one of the two flow obstructing members 89 and 90 acts as a check valve depending on the direction of the flow. The O-rings 93 and 94 may be included in the converging extremities of the tapered flow passages 87 and 88 to provide a bubble-tight seat for the flow obstructing members 89 and 90, when they act as a check valve. It is readily recognized that one of the electrical read-out means shown in FIGS. 2, 4 and 5 may be incorporated into the bidirectional rotameter shown in FIG. 14 in order to remotely display the flow date or to process the flow data by a data processor.

While the principles of the present inventions have now been made clear by the illustrative embodiments, there will be many obvious modifications of the structures, arrangements, proportions, elements and materials, which are particularly adapted to the specific working environments and operating conditions in the practice of the inventions without departing from those principles. It is not desired to limit the inventions to the illustrative embodiments shown and described and, accordingly, all suitable modifications and equivalents may be resorted to falling within the scope of the inventions as defined by the claims which follow.

The embodiments of the invention, in which an exclusive property or priviledge is claimed, are defined as follows:

1. An apparatus for measuring fluid flow comprising in combination:
   (a) a flow passage including a first vertical section with one extremity connected to an inlet port, a second vertical section with one extremity connected to an outlet port and a midsection connecting the other extremities of the first and second vertical sections of the flow passage to one another, wherein at least one of the first and second vertical sections of the flow passage has a tapered geometry with cross sectional area of the flow passage increasing from inlet end to outlet end thereof;
   (b) a first flow obstructing member disposed within the first section of the flow passage movably along the length thereof, and a second flow obstructing member disposed within the second section of the flow passage movably along the length thereof, wherein the first and second flow obstructing members are connected to one another by a flexible elongated member;
   (c) means for supporting a vertical section of said flexible elongated member suspending the first flow obstructing member and another vertical section of said flexible elongated member suspending the second flow obstructing member in a slidable arrangement; and
   (d) means for indicating position of at least one of the first and second flow obstructing members along the lengthwise direction of the flow passage as a measure of the flow rate of a fluid moving through the flow passage.

2. A combination as set forth in claim 1 wherein the first and second flow obstructing members have the same volume displacing the surrounding fluid and have different mass, wherein buoyancy forces on the first and second flow obstructing members cancel one another and the difference in the weight between the first and second flow obstructing members provides a resultant force acting in a direction opposite to the direction of the fluid flow, that counter-acts drag force on the first and second flow obstructing members exerted by the fluid flow.

3. A combination as set forth in claim 2 wherein said means for indicating position comprises a visual scale.

4. A combination as set forth in claim 2 wherein said means for indicating position comprises a magnet attached to a midsection of the flexible elongated member and an electrically conducting ball made of a ferromagnetic material and movable following a pair of electrically conducting elongated members by rolling motion under the attraction by said magnet, wherein at least one of said pair of electrically conducting elongated members has a high specific ohmic resistance, said combination of the electrically conducting ball and the pair of electrically conducting elongated members disposed in a cavity disposed parallel and adjacent to said midsection of the flexible elongated member and sealed off from the fluid moving through the flow passage, wherein position of said magnet representing position of at least one of the first and second flow obstructing members is determined from at least one of two ohmic resistance values respectively belonging to two electrical circuits provided by two portions of said pair of electrically conducting elongated members respectively located on two opposite sides of said electrically conducting ball.

5. A combination as set forth in claim 2 wherein said means for indicating position comprises a magnet attached to a midsection of the flexible elongated member and an electrically conducting ball made of a ferromagnetic material and movable following a pair of electrically conducting elongated members by rolling motion under the attraction by said magnet, wherein at least one of said pair of electrically conducting elongated members has a high specific inductance, said combination of the electrically conducting ball and the pair of electrically conducting elongated members disposed in a cavity disposed parallel and adjacent to said midsection of the flexible elongated member and sealed off from the fluid moving through the flow passage, wherein position of said magnet representing position of at least one of the first and second flow obstructing members is determined from at least one of two inductance values respectively belonging to two electrical circuits provided by two portions of said pair of electrically conducting elongated members respectively located on two opposite sides of said electrically conducting ball.

6. A combination as set forth in claim 2 wherein said means for indicating position comprises a variable area rotary capacitor disposed exteriorly to the flow passage including an arm affixed to and radially extending from rotor plate of the variable area rotary capacitor and magnetic means exerting a force to at least one extremity of said arm, that rotates said arm following the movement of at least one of the first and second flow obstructing members, wherein the position of at least one of the first and second flow obstructing members is determined from the capacitance value of said variable area rotary capacitor.

7. A combination as set forth in claim 2 wherein said combination includes means for measuring an average value of tension on a midsection of the flexible elongated member, wherein density of the fluid is determined as a function of sum of the weights of the first and second flow obstructing members minus twice the average value of tension.

8. A combination as set forth in claim 7 wherein the volume flow rate of fluid is determined from a combination of the position of at least one of the first and second flow obstructing members and the density of the fluid.

9. A combination as set forth in claim 8 wherein mass flow rate of the fluid is determined as the product of the volume flow rate and the density of the fluid.

10. A combination as set forth in claim 1 wherein the first and second flow obstructing members have the same mass and have different volume displacing the surrounding fluid, wherein the weights of the first and second flow obstructing members cancel one another and difference in the buoyancy force between the first and second flow obstructing members provides a resultant force acting in a direction opposite to the direction of the fluid flow, that counter-acts drag force on the first and second flow obstructing members exerted by the fluid flow.

11. A combination as set forth in claim 10 wherein said means for indicating position comprises a visual scale.

12. A combination as set forth in claim 10 wherein said means for indicating position comprises a magnet attached to a midsection of the flexible elongated member and an electrically conducting ball made of a ferromagnetic material and movable following a pair of electrically conducting elongated members by rolling motion under the attraction by said magnet, wherein at least one of said pair of electrically conducting elongated members has a high specific ohrmic resistance, said combination of the electrically conducting ball and the pair of electrically conducting elongated members disposed in a cavity disposed parallel and adjacent to said midsection of the flexible elongated member and sealed off from the fluid moving through the flow passage, wherein position of said magnet representing position of at least one of the first and second flow obstructing members is determined from at least one of two ohmic resistance values respectively belonging to two electrical circuits provided by two portions of said pair of electrically conducting elongated members respectively located on two opposite sides of said electrically conducting ball.

13. A combination as set forth in claim 10 wherein said means for indicating position comprises a magnet attached to a midsection of the flexible elongated member and an electrically conducting ball made of a ferromagnetic material and movable following a pair of electrically conducting elongated members by rolling motion under the attraction by said magnet, wherein at least one of said pair of electrically conducting elongated members has a high specific inductance, said combination of the electrically conducting ball and the pair of electrically conducting elongated members disposed in a cavity disposed parallel and adjacent to said midsection of the flexible elongated member and sealed off from the fluid moving through the flow passage, wherein position of said magnet representing position of at least one of the first and second flow obstructing members is determined from at least one of two inductance values respectively belonging to two electrical circuits provided by two portions of said pair of electrically conducting elongated members respectively located on two opposite sides of said electrically conducting ball.

14. A combination as set forth in claim 10 wherein said means for indicating position comprises a variable area rotary capacitor disposed exteriorly to the flow passage including an arm affixed to and radially extending from rotor plate of the variable area rotary capacitor and magnetic means exerting a force to at least one extremity of said arm, that rotates said arm following the movement of at least one of the first and second flow obstructing members, wherein the position of at least one of the first and second flow obstructing members is determined from the capacitance value of said variable area rotary capacitor.

15. A combination as set forth in claim 1 wherein the flexible elongated member is routed through a cavity open to the flow passage and filled with fluid, wherein at least one of said a vertical section and said another vertical section of the flexible elongated member includes a float providing a buoyancy force that is disposed in said cavity and affixed to the flexible elongated member wherein the total mass attached to said a vertical section of the flexible elongated member is equal to the total mass attached to said another vertical section of the flexible elongated member, and the difference in buoyancy force between the two total masses respectively attached to said a and another vertical sections of the flexible elongated member provides a resultant force acting in a direction opposite to the direction of fluid flow, that counter-acts drag force on the first and second flow obstructing members exerted by the fluid flow.

16. A combination as set forth in claim 15 wherein said means for indicating position comprises a visual scale.

17. A combination as set forth in claim 15 wherein said means for indicating position comprises a magnet attached to a midsection of the flexible elongated member and an electrically conducting ball made of a ferromagnetic material and movable following a pair of electrically conducting elongated members by rolling motion under the attraction by said magnet, wherein at least one of said pair of electrically conducting elongated members has a high specific ohrmic resistance, said combination of the electrically conducting ball and the pair of electrically conducting elongated members disposed in a cavity disposed parallel and adjacent to said midsection of the flexible elongated member and sealed off from the fluid moving through the flow passage, wherein position of said magnet representing position of at least one of the first and second flow obstructing members is determined from at least one of two ohmic resistance values respectively belonging to two electrical circuits provided by two portions of said pair of electrically conducting elongated members respectively located on two opposite sides of said electrically conducting ball.

18. A combination as set forth in claim 15 wherein said means for indicating position comprises a magnet attached to a midsection of the flexible elongated member and an electrically conducting ball made of a ferromagnetic material and movable following a pair of electrically conducting elongated members by rolling motion under the attraction by said magnet, wherein at least one of said pair of electrically conducting elongated members has a high specific inductance, said combination of the electrically conducting ball and the pair of electrically conducting elongated members disposed in a cavity disposed parallel and adjacent to said midsection of the flexible elongated member and sealed off from the fluid moving through the flow passage, wherein position of said magnet representing position of at least one of the first and second flow obstructing members is determined from at least one of two inductance values respectively belonging to two electrical circuits provided by two portions of said pair of electrically conducting elongated members respectively located on two opposite sides of said electrically conducting ball.

19. A combination as set forth in claim 15 wherein said means for indicating position comprises a variable area rotary capacitor disposed exteriorly to the flow passage including an arm affixed to and radially extending from rotor plate of the variable area rotary capacitor and magnetic means exerting a force to at least one extremity of said arm, that rotates said arm following the movement of at least one of the first and second flow obstructing members, wherein the position of at least one of the first and second flow obstructing members is determined from the capacitance value of said variable area rotary capacitor.

* * * * *